J. F. HERMANCE.
Packing for Piston-Rods.

No. 137,444. Patented April 1, 1873.

Witnesses.
A. J. Tibbits
J. H. Shumway

John F. Hermance
Inventor
By Atty.

UNITED STATES PATENT OFFICE.

JOHN F. HERMANCE, OF NEW HAVEN, CONNECTICUT, ASSIGNOR TO HENRY P. OSTROM AND AARON C. ANDREWS, OF SAME PLACE.

IMPROVEMENT IN PACKINGS FOR PISTON-RODS.

Specification forming part of Letters Patent No. 137,444, dated April 1, 1873; application filed September 20, 1872.

*To all whom it may concern:*

Be it known that I, JOHN F. HERMANCE, of New Haven, in the county of New Haven and State of Connecticut, have invented a new Improvement in Packing for Piston-Rods; and I do hereby declare the following, when taken in connection with the accompanying drawing and the letters of reference marked thereon, to be a full, clear, and exact description of the same, and which said drawing constitutes part of this specification, and represents, in—

Figure 1:
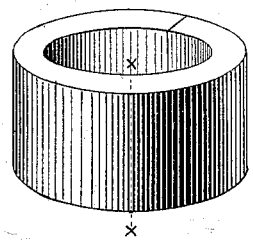
Figure 3:
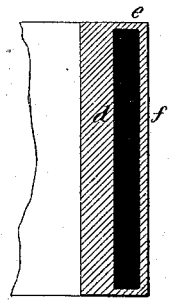
Figure 2:
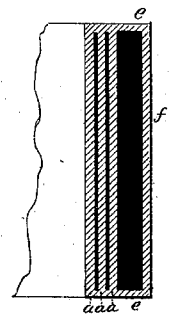

Figure 1, a perspective view; Fig. 2, a section on line $x\ x$; Fig. 3, the same section, showing a modification of construction; and in Fig. 4, a transverse section.

This invention relates to the construction of a packing for piston-rods, particularly designed for steam-engines; and it consists in a divided ring, formed from an India-rubber body, inclosed entirely by a fabric which, placed around the rod within the box and compressed therein, will perfectly pack the rod, and prevent the escape of steam.

Figure 4:
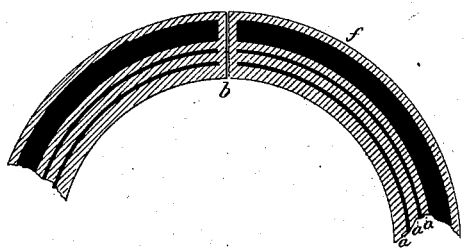

I first form a ring of solid India rubber or of rubber compound, as denoted in solid black, Figs. 2 and 4; and, previous to vulcanization, place upon the inside layers $a$ of fabricated material, as denoted in Fig. 2; or one thick layer, $d$, of fabricated material, as denoted in Fig. 3.

Where several layers are employed, as in Fig. 2, India rubber, or a composition thereof, should be placed between the layers; and upon the outside another fabric, $f$, and a similar fabric, $e$, upon the edges, so that the India rubber is entirely inclosed. In this form the article is vulcanized in the usual manner. Then, for convenience of application, the ring is divided, as at $b$, and the ends covered by a suitable fabric.

By this construction no part of the India rubber will come in contact with the box or the rod.

The ring is made corresponding to the diameter of the box and rod, and is placed around the rod and into the box, and there compressed in the usual manner for stuffing-box packings. The India rubber, being compressed, forces the internal fabric onto the rod, and, externally, onto the box, so as to perfectly pack, and prevent the escape of steam.

As the packing wears by the movement of the rod, it may be set up in the usual manner.

The India rubber will, by its natural expansion, prevent the necessity of frequent setting up.

I claim as my invention—

As an article of manufacture, the herein-described stuffing-box packing, consisting of the divided rings, formed from an India-rubber body, completely inclosed within a fabric, substantially as set forth.

J. F. HERMANCE.

Witnesses:
JOHN E. EARL,
A. J. TIBBITS.